Aug. 23, 1938. R. W. B. READE 2,128,190
MACHINE FOR PRODUCING COATED MATERIAL
Filed Nov. 28, 1934 2 Sheets-Sheet 2
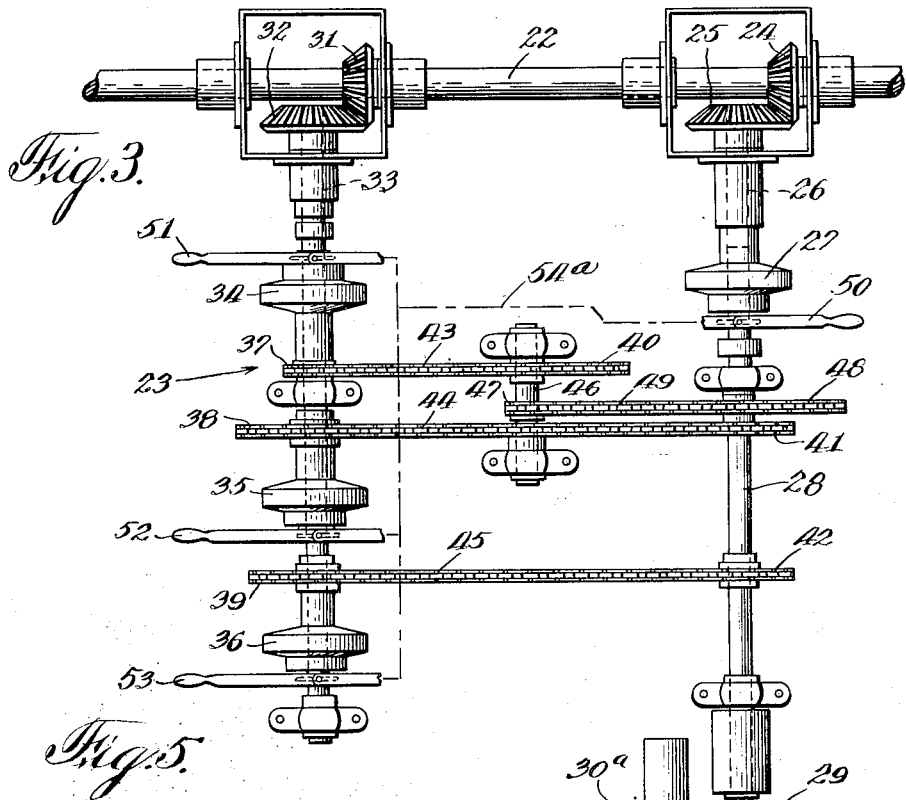
Fig. 3.
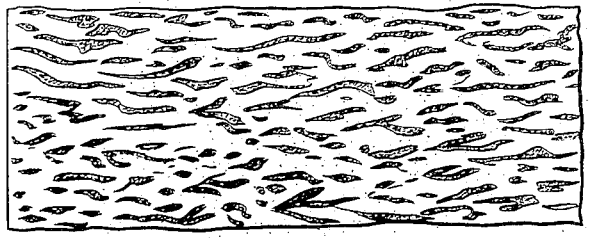
Fig. 5.
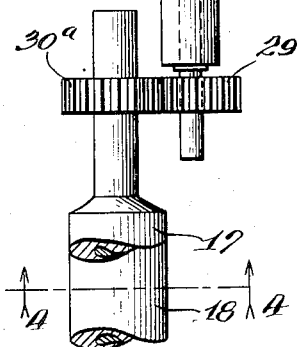
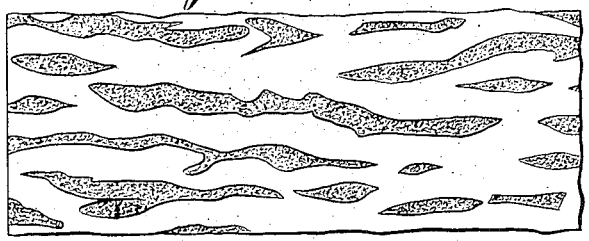
Fig. 6.
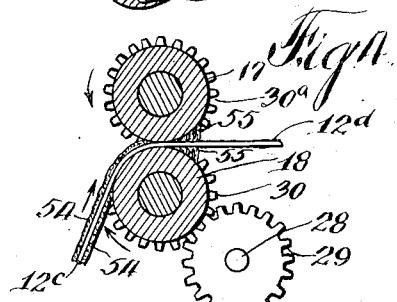
Inventor:
Ralph W. B. Reade.
By Jones, Addington, Ames & Seibold, Attys.

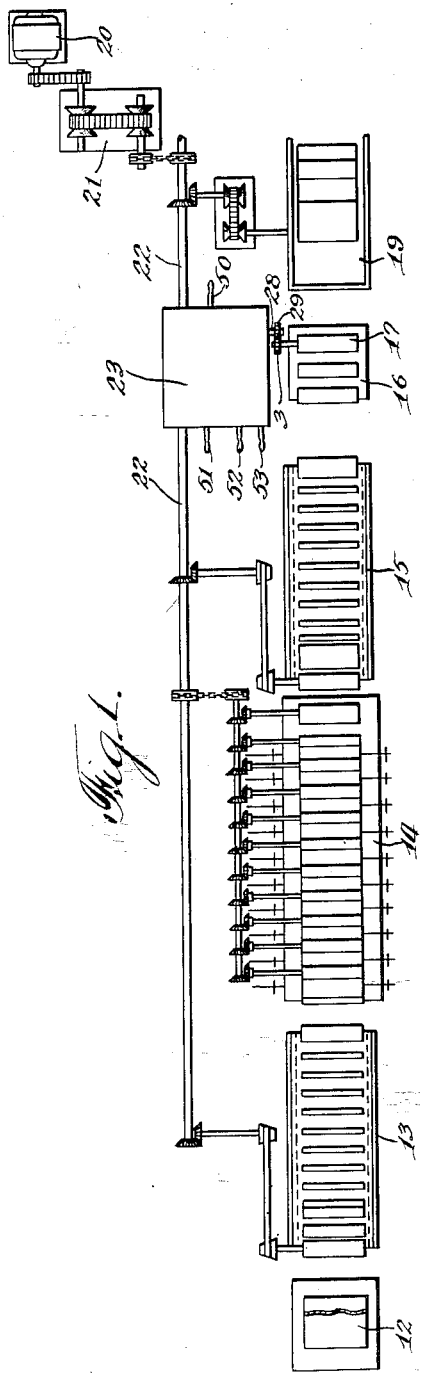
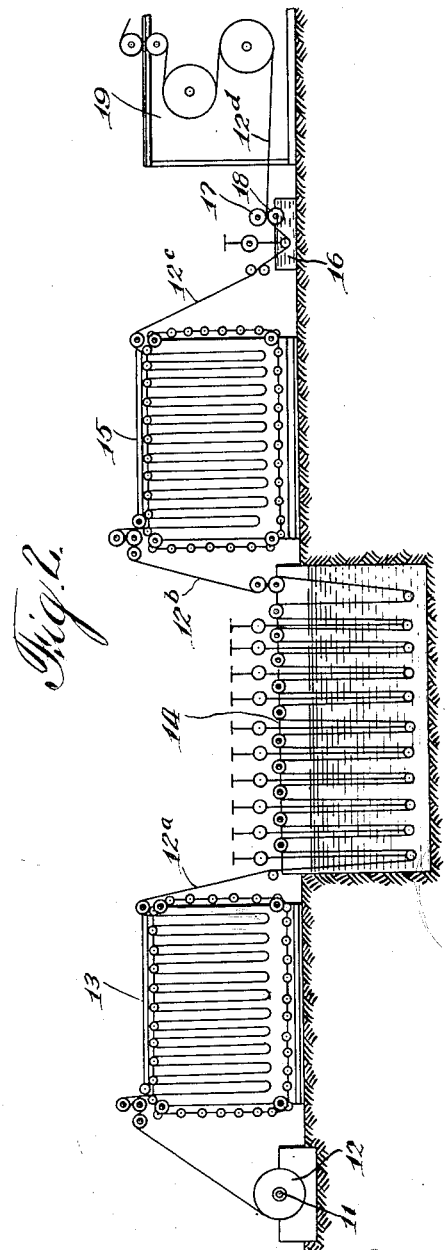

Patented Aug. 23, 1938

2,128,190

UNITED STATES PATENT OFFICE 2,128,190

MACHINE FOR PRODUCING COATED MATERIAL

Ralph W. B. Reade, Winnetka, Ill., assignor to United States Gypsum Company, Chicago, Ill., a corporation of Illinois Application November 28, 1934, Serial No. 755,118

9 Claims. (Cl. 91—31)

This invention relates to a machine for producing coated material and has particular relation to the manufacture of roofing material coated with a substance having a desired surface effect or texture generally known in the art as a corrugated surface.

Prepared roofing materials are ordinarily produced by a continuous process whereby a web or foundation sheet of felt or other material is saturated or impregnated with an asphalt or other substance having a relatively low melting point and thereafter coated on one or both faces with an asphalt or other substance having a relatively high melting point in order to withstand the heat of the sun and the action of other elements. In this coating process, coating rolls are ordinarily employed to apply the coating substance in the desired manner after the web or foundation sheet has been immersed therein, and it has heretofore been the practice to have these coating rolls either driven at a peripheral speed corresponding to the lineal speed of the sheet or to have them driven at a much lower speed or maintained stationary.

The stationary roll arrangement has been used extensively in the manufacture of smooth surfaced roofing material, and in this manner the amount of coating on the sheets is calipered to the desired thickness. This arrangement is subject to the disadvantage, however, that small particles of foreign material sometimes accumulate into lumps and wedge themselves between the coating rolls where the sheet enters and thereby cause streaks in the roofing. In order to avoid this, it has been customary in some instances to turn these rolls very slowly, for example, at two or three revolutions per minute, which may give a peripheral speed corresponding to not more than 5% of the lineal speed of the sheet passing through the rolls. In this way any foreign material is carried along between the rolls and the streaks in the sheets are thus prevented and wastage of material is thereby avoided.

In the manufacture of the so-called corrugated surface roofing material having a leather-like grain or so-called grapevine finish, it is customary to turn the coating rolls at a peripheral speed corresponding to the lineal speed of the sheet passing between the rolls. While this arrangement may give satisfactory results under some conditions, difficulty has been encountered in many cases in that the grain or texture of the surfaces of the finished sheet is long and coarse and of unattractive appearance. This is particularly true where the coating material that is being used is quite thick or where the rolls are relatively large in diameter.

I have discovered that this objectionable feature may be overcome by operating the coating rolls at a peripheral speed greater than the lineal speed of the sheet, and, further, that the grain or surface effect may be varied within desired limits by varying the amount of excess speed of the rolls. It is an object of this invention, therefore, to provide an apparatus for producing roofing material of the desired grain or surface effect by operating the coating rolls at a peripheral speed greater than the lineal speed of the sheet, and to produce different desired surface effects by varying the speed of operation of the coating rolls with relation to the speed of the sheet.

It is desirable to have a roofing machine so arranged that various types of roofing material may be produced thereby without extensive changes in the set-up of the machine and it is therefore a further object of my invention to provide a simple means whereby the coating rolls may be operated at any desired speed or may be maintained stationary if desired, so that any desired surface effect on any desired type of material may be produced without resorting to a change of rolls from one size to another or other mechanical changes.

The invention will be more fully understood and other objects and advantages thereof will become apparent from the following detailed description of a preferred embodiment of the invention, considered in conjunction with the accompanying drawings forming a part hereof, in which:

Figure 1 is a diagrammatic plan view of a portion of a roofing machine embodying the mechanical features of the invention in a preferred form thereof;

Fig. 2 is a diagrammatic side elevational view of the machine, showing the path of movement of a continuous web of material therethrough;

Fig. 3 is a fragmentary detail plan view showing the essential features of a speed change mechanism embodied in the machine;

Fig. 4 is a fragmentary view, partly in section and partly in elevation, taken on the line 4—4 of Fig. 3, showing the arrangement and mode of operation of the coating rolls; and Figs. 5 and 6 are views showing the surface appearance of sheets of material coated in accordance with the invention but under different conditions, whereby different surface effects are obtained.

Referring first to Figs. 1 and 2 of the drawings, the machine there illustrated comprises a suitable support 11 for a roll 12 of the sheet material to be coated. This material is first passed through a device 13 known as a "looper," wherein any desired preliminary treatment may be applied to the sheet. This type of device is well known in the art and requires no detailed description herein because it does not constitute a part of the invention, being illustrated merely to assist in showing the relationship of the invention to the machine as a whole.

From the looper 13 the web of material 12a passes through a vat 14 in a number of loops to be impregnated with a suitable saturant contained in the vat. The web emerging from the saturator, as shown at 12b, is passed through another looper 15 wherein any desired further treatment may be carried out to prepare the saturated web for the application of the coating material thereto.

The web passes from the looper 15, as indicated at 12c, to a coating tank 16 wherein the desired coating material is applied thereto. This material, ordinarily consisting of a form of asphalt, is relatively thick and viscid and the application thereof to the web is governed by upper and lower coating rolls 17 and 18, between which the web is drawn. The web leaving the coating rolls, as shown at 12d, passes through the remaining portions of the machine, designated generally by the reference character 19, and any desired subsequent treatment may be thus given to the coated material thereby. Inasmuch as the present invention has to do with the coating process and apparatus, however, it is not deemed necessary to illustrate or describe any further details of the machine, which may be of any desired and well-known type, except to say that the coated sheet is drawn through the entire machine independently of any movement of the coating rolls.

The machine may be driven by an electric motor 20 connected through suitable transmission means 21 to a main line shaft 22 from which the various parts of the machine, including the loopers 13 and 15 and the saturator 14, are individually driven. The shaft 22 extends through a speed change mechanism designated generally by the reference character 23 and the coating rolls 17 and 18 are driven from the shaft 22 through this mechanism, as illustrated in detail in Figs. 3 and 4. Referring to these figures, it will be seen that the shaft 22 carries a bevel gear 24 which intermeshes with a bevel gear 25 secured to a shaft 26, to the opposite end of which is secured the driving element of a clutch 27. The driven element of this clutch is secured to a shaft 28 which drives the coating rolls 17 and 18 through suitable gearing, including a driving gear 29 secured to the shaft 28 and intermeshing with a gear 30 secured to the shaft of the roll 18. The gear 30, in turn, intermeshes with a similar gear 30a secured to the shaft of the roll 17, and the direction of drive is such that the two rolls are driven in the respective directions indicated by the arrows in Fig. 4. Thus, the opposed faces of the rolls, contacting with the opposite faces of the coated sheet, have the same direction of movement as the sheet.

The main line shaft 22 also carries a bevel gear 31 intermeshing with a bevel gear 32 secured to a shaft 33 to which are also secured the driving elements of clutches 34, 35, and 36. The driven elements of these clutches respectively carry sprocket wheels 37, 38, and 39, which drive sprocket wheels 40, 41, and 42 by means of sprocket chains 43, 44, and 45. The sprocket wheel 40 is secured to a countershaft 46, which also carries a sprocket wheel 47, driving a sprocket wheel 48 by means of a connecting sprocket chain 49. The sprocket wheels 41, 42, and 48 are all secured to the roll driving shaft 28 which is adapted to be selectively driven through the three sprocket wheel and chain connections described, as well as to be directly driven through the clutch 27.

The clutches 27, 34, 35, and 36 are controlled by handles 50, 51, 52, and 53, respectively, and are interlocked by means of any suitable well-known mechanism indicated schematically by the dot and dash connecting lines 54a, so that not more than one of the four clutches can be engaged at any one time.

When all four of the clutches 27, 34, 35, and 36 are disengaged, the coating rolls 17 and 18 will be maintained stationary, for which purpose a brake (not shown) may be provided if desired. When the machine is operated with the rolls stationary, said rolls will serve merely as calipering means to regulate the thickness of the coated sheet as desired. In order to avoid the hereinbefore-mentioned disadvantages of using entirely stationary rolls, however, the clutch 34 may be engaged to drive the rolls at a very slow rate of speed, which is obtained by reason of the double reduction through the sprocket wheels 37 and 40 and the sprocket wheels 47 and 48.

For the type of operation in which it is desired to operate the rolls 17 and 18 at a peripheral speed corresponding to the lineal speed of the sheet being coated, the clutch 27 may be engaged to effect a direct driving connection between the shafts 26 and 28, the diameter of the rolls and the total ratio of the drive being such as to produce that result. This ratio, as well as the other ratios herein mentioned, will, of course, be preserved independently of the actual speed of operation of the entire machine, which may vary under different conditions.

The principal object of the invention, consisting in driving the coating rolls at a peripheral speed greater than the lineal speed of the sheet being coated, is accomplished by manipulation of the clutches 35 and 36. When the clutch 35 is engaged, the driving connection to the rolls is completed through the sprocket wheels 38 and 41, and, when the clutch 36 is engaged, the driving connection is completed through the sprocket wheels 39 and 42. The former connection may suitably provide such a driving ratio as to operate the rolls at a peripheral speed equal to 150% of the lineal speed of the sheet, which I have found to produce particularly satisfactory results, and the latter connection may, for example, produce a peripheral roll speed equal to 125% of the sheet speed. It will be understood, of course, that as many different speed ratios as desired may be provided and that peripheral roll speeds even greater than 150% of the sheet speed may be utilized to advantage in some cases.

I have found that by increasing the peripheral speed of the rolls above the sheet speed an improved surface appearance is produced, even when the coating substance is particularly thick and heavy and even where the coating rolls are of relatively large diameter. The product has a fine, short grain of good appearance, which can be varied within desired limits by the use of the different excess speed ratios provided, the variations in effect being due to the different characteristics of adherence of the viscid coating substance to the rolls at the different speeds of the latter. As shown in Fig. 4, the web 12c, after application of the coating substance to both surfaces thereof, as indicated at 54, 54, passes through the nip of the rolls 17 and 18 where the application of the coating with the desired uniformity is completed. As the web 12d emerges from the rolls the coating substance adheres to the latter and strings out as indicated at 55, 55, by reason of its viscid nature.

Depending upon the ratio of the peripheral speed of the rolls to the lineal speed of the sheet, these stringy particles of the coating substance will be drawn out to a greater or lesser extent before rupturing or pulling free of the rolls and will consequently produce different surface effects upon the coated sheet. The modulus of elasticity of the coating substance is such that it will stretch out to some extent in any event, but the extent of stretching will decrease as the speed of the rolls is increased. In other words, when the strings of materials are drawn out relatively rapidly, they will rupture or separate from the rolls more rapidly than if they are pulled out relatively slowly, and it is by reason of this action that the variation in the speed of the rolls may be utilized to produce the desired different surface effects on the coated material. The effect may also be enhanced or modified by the variations in centrifugal force due to the changes in roll speed.

The shorter the grain that is desired, the more the speed of the rolls is increased over the speed of the sheet. For example, Fig. 5 of the drawings illustrates the fine grain appearance of the product turned out when the rolls are operated at one speed ratio above the sheet speed, while Fig. 6 illustrates the coarser grained product made at a somewhat smaller increase of roll speed over the sheet speed. These products, if made with the coating rolls operating at a peripheral speed equivalent to or less than the lineal speed of the sheet, but otherwise under the same conditions, would have an excessively coarse grain which would not be satisfactory.

For other types of products, however, it may be desirable to operate the machine with the coating rolls turning at a peripheral speed corresponding to or less than the lineal speed of the sheet, or to maintain the rolls stationary. The speed change mechanism herein disclosed, therefore, is adaptable to all of the conditions under which the machine may be operated, because it provides means for disconnecting the rolls from the driving means so that they can be maintained stationary and means for driving the rolls either at a very low rate of speed or at a speed corresponding to the sheet speed, as well as providing a selection of increased speeds which are desirable under certain conditions of operation.

The various speed changes are readily effected by simply engaging the required one of the clutches 27, 34, 35, or 36 (or by leaving them all disengaged) by means of the operating handles 50, 51, 52, and 53. Much time is saved in changing the machine over from one type of operation to another, because it is unnecessary to provide a number of sets of rolls of different sizes to be interchanged for producing different results, and no other mechanical changes, except the selection of the desired roll speed by means of the change speed mechanism, are required.

While only one specific embodiment of the invention has been shown and described herein, it will be readily understood by those skilled in the art that various changes and modifications in the details of design and arrangement of parts of the apparatus and in the mode of carrying out the process may be made without departing from the spirit and scope of the invention as set forth in the appended claims. For example, the sheet may be coated on either one or both surfaces, as desired, and any desired speed ratios other than those specifically mentioned herein may be provided for the operation of the coating rolls. It will also be understood that the rolls as well as other parts of the machine may be driven by any desired type of driving means or connections.

What is claimed as new and desired to secure by Letters Patent, therefore, is:

1. A machine for producing coated sheet material, comprising means for applying a coating substance to a sheet, roller means engaging the sheet thus coated to produce a desired surface effect on the coating substance, means for advancing the sheet in contact with the roller means independently of the operation of the latter, and selective means for rotatively driving said roller means at different speeds to produce different surface effects on said coated material.

2. A machine for producing coated sheet material, comprising means for applying a coating substance to both surfaces of a sheet, a pair of coating rolls engaging the opposite faces of the sheet thus coated to produce a desired surface effect on the coating substance, means for advancing the sheet in contact with the coating rolls independently of the operation of the latter, and selective means for rotatively driving said coating rolls at different speeds to produce different surface effects on said coated material.

3. A machine for producing coated sheet material, comprising means for applying a coating substance to a sheet, roller means engaging the sheet thus coated to produce a desired surface effect on the coating substance, means for advancing the sheet in contact with the roller means independently of the operation of the latter, and selective means for rotatively driving said roller means at different peripheral speeds in excess of the rate at which the sheet is being advanced, and in the same direction therewith, to produce different surface effects on said coated material.

4. A machine for producing coated sheet material, comprising means for applying a coating substance to a sheet, roller means engaging the sheet thus coated to produce a desired surface effect on the coating substance, means for advancing the sheet in contact with the roller means independently of the operation of the latter, driving means connected to said advancing means, and variable speed transmission means between said driving means and said roller means for rotatively driving the latter at different speeds to produce different surface effects on said coated material.

5. A machine for producing coated sheet material, comprising means for applying a coating substance to both surfaces of a sheet, a pair of coating rolls engaging the opposite faces of the sheet thus coated to produce a desired surface effect on the coating substance, means for advancing the sheet in contact with the coating rolls independently of the operation of the latter, driving means connected to said advancing means, and variable speed transmission means between said driving means and said coating rolls for rotatively driving the latter in unison at different speeds to produce different surface effects on said coated material.

6. A machine for producing coated sheet material, comprising means for applying a coating substance to a sheet, roller means engaging the sheet thus coated, means for advancing the sheet in contact with the roller means independently of the operation of the latter, and means for rotatively driving the roller means at a peripheral speed in excess of the rate at which the sheet is being advanced, and in the same direction therewith, to produce a desired surface effect on said coated material.

7. A machine for producing coated sheet material, comprising means for applying a coating substance to a sheet, roller means engaging the sheet thus coated, means for advancing the sheet in contact with the roller means independently of the operation of the latter, and means for rotatively driving the roller means at a peripheral speed equal to approximately 150% of the rate at which the sheet is being advanced, and in the same direction therewith, to produce a desired surface effect on said coated material.

8. A machine for producing coated sheet material, comprising means for applying a coating substance to both surfaces of a sheet, a pair of coating rolls engaging the opposite faces of the sheet thus coated, means for advancing the sheet in contact with the coating rolls independently of the operation of the latter, and means for rotatively driving the coating rolls at a peripheral speed in excess of the rate at which the sheet is being advanced, and in the same direction therewith, to produce a desired surface effect on said coated material.

9. A machine for producing coated sheet material, comprising means for applying a coating substance to both surfaces of a sheet, a pair of coating rolls engaging the opposite faces of the sheet thus coated, means for advancing the sheet in contact with the coating rolls independently of the operation of the latter, and means for rotatively driving the coating rolls at a peripheral speed equal to approximately 150% of the rate at which the sheet is being advanced, and in the same direction therewith to produce a desired surface effect on said coated material.

RALPH W. B. READE.